Sept. 14, 1926. 1,599,790
C. H. RANKIN
METHOD OF AND APPARATUS FOR DELIVERING MASSES OF GLASS FROM A
FURNACE TO A MOLD
Filed Sept. 11, 1920 3 Sheets-Sheet 2
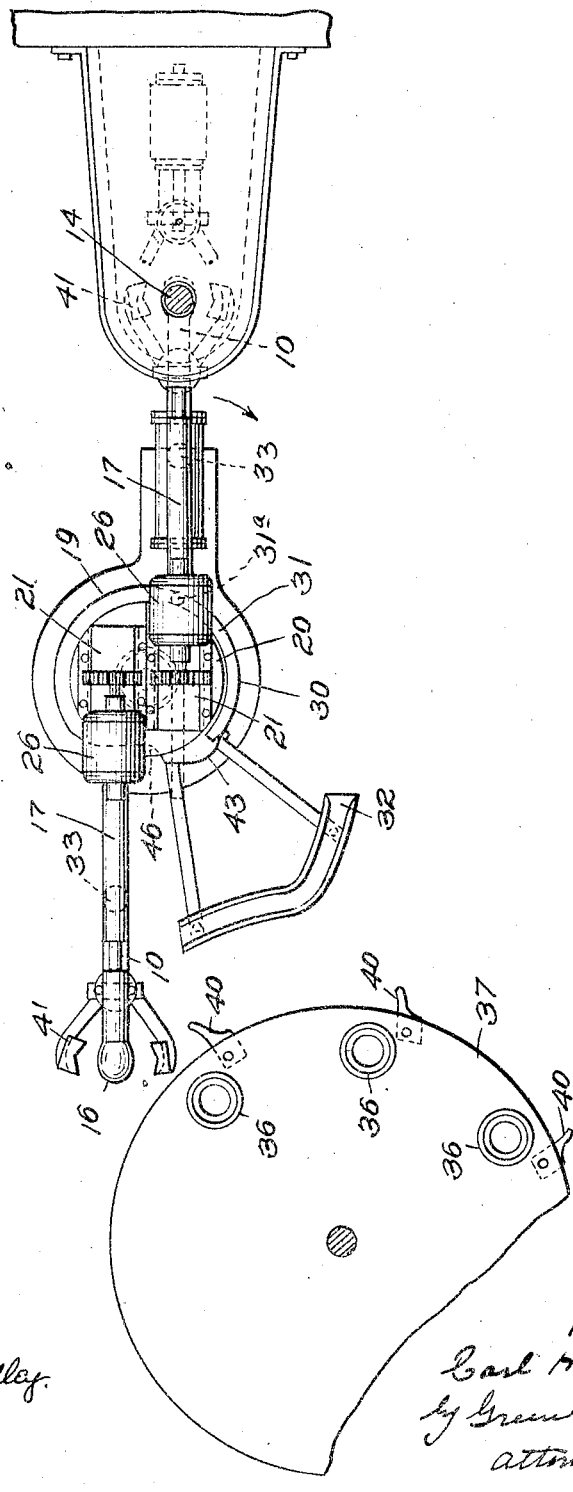
WITNESSES
J. Herbert Bradley
INVENTOR
Carl H. Rankin
by Green & McCallister
Attorneys Sept. 14, 1926. 1,599,790
C. H. RANKIN
METHOD OF AND APPARATUS FOR DELIVERING MASSES OF GLASS FROM A
FURNACE TO A MOLD
Filed Sept. 11, 1920   3 Sheets-Sheet 3
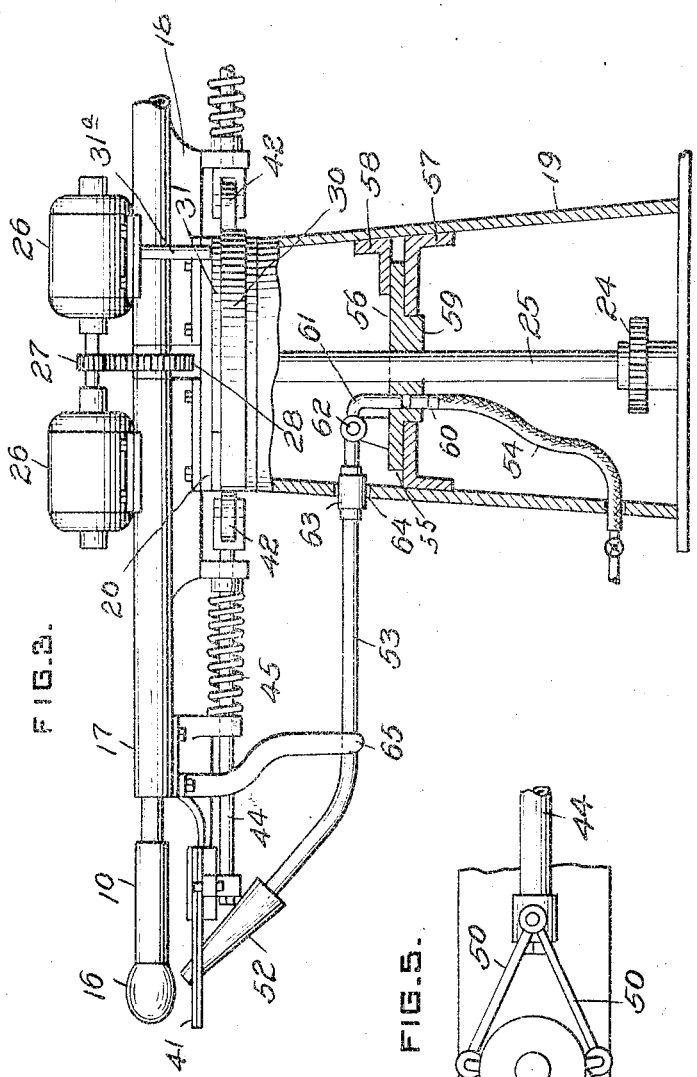
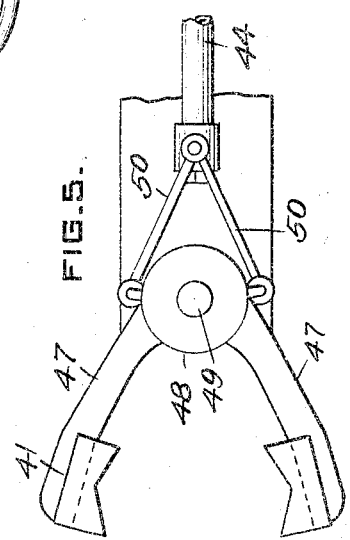
WITNESSES
INVENTOR Patented Sept. 14, 1926.

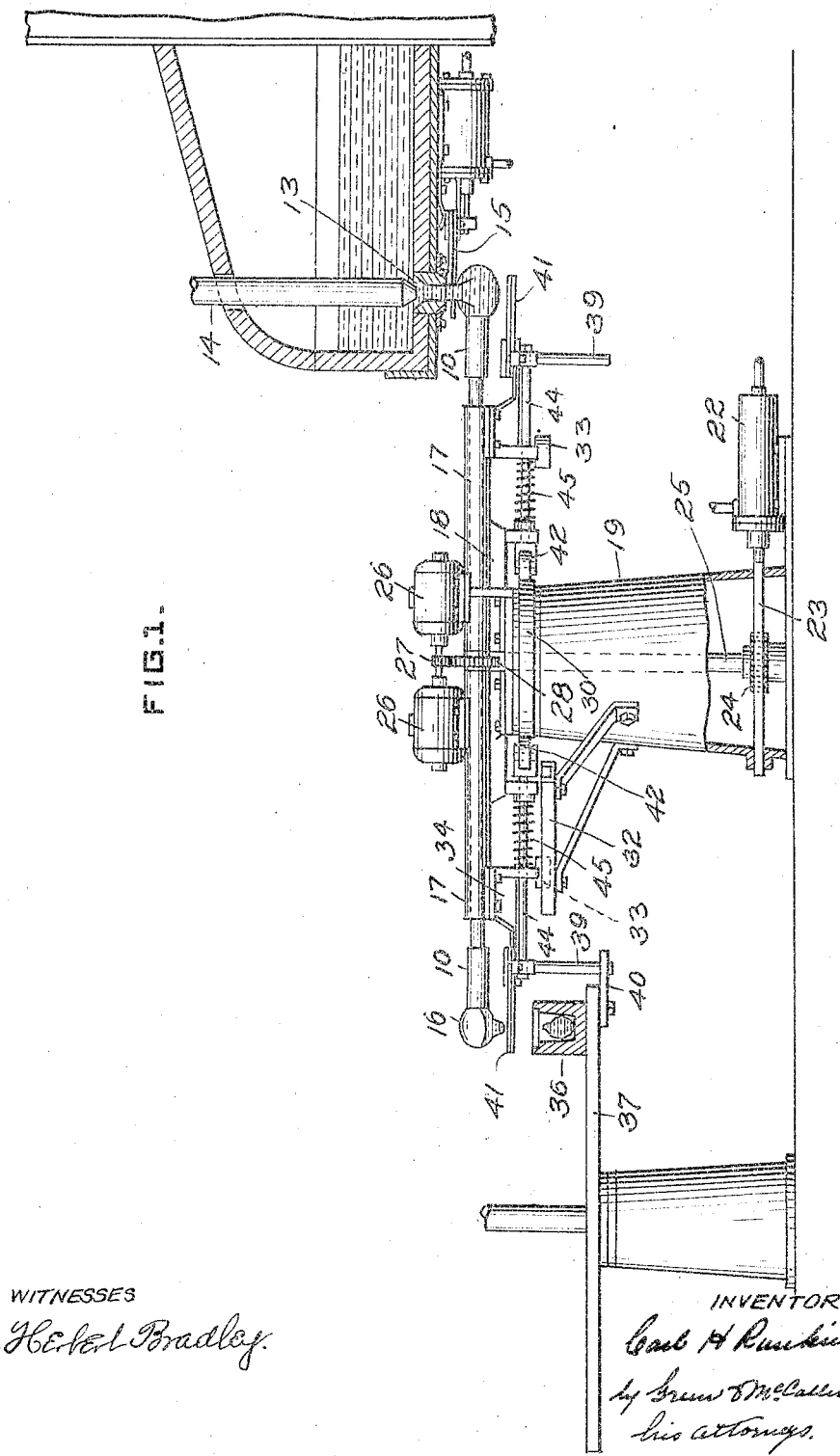

1,599,790

UNITED STATES PATENT OFFICE.

CARL HENRY RANKIN, OF WELLSBURG, WEST VIRGINIA, ASSIGNOR, BY MESNE ASSIGNMENTS, OF ONE-FOURTH TO CHARLES JAMES PURDIE PRATT, OF LONDON, ENGLAND.

METHOD OF AND APPARATUS FOR DELIVERING MASSES OF GLASS FROM A FURNACE TO A MOLD.

Application filed September 11, 1920. Serial No. 409,690.

This invention relates to glass-making machines and particularly to an improved mechanism for delivering charges of glass from a furnace to a series of moving molds.

An object of the invention is to produce a mechanism of the character described, which is adapted to receive a charge of glass from a furnace and to deliver the charge so received to a moving mold.

A further object is to produce a mechanism in which automatically controlled means are employed for collecting a charge of glass from a flow orifice of a furnace and for delivering the charge so collected to a moving mold.

A further object is to produce a mechanism in which a charge of glass is collected on a conveyor member similar to a punty and means are employed for manipulating the member to maintain the charge in place thereon, and means are also employed for causing the member to deliver the charge to a mold while the mold is moving.

A further object is to produce a new and improved process for collecting a charge of glass from a glass furnace and for delivering the same to a continuously moving mold.

These and other objects are attained by means of a mechanism embodying the features herein illustrated and described.

In the drawings accompanying and forming a part hereof, I have illustrated a machine or mechanism embodying my invention and operating in accordance with the process herein set forth as an embodiment of my invention.

In the drawings, Figure 1 is a side elevation of a mechanism embodying my invention and shown in connection with the forehearth of a glass furnace and the rotating mold carrying table of a glass pressing or blowing machine. Figure 2 is a plan view of the apparatus illustrated in Figure 1. Figure 3 is a fragmental sectional view of the apparatus illustrated in Figure 1 and illustrates in detail the arrangement of a punty heating device forming a detail of the mechanism. Figure 4 is a fragmental view of a portion of the apparatus shown in Figure 3 and illustrates a portion of the means employed for actuating the heating device. Figure 5 is a detail view of shears forming a part of the mechanism illustrated in Figures 1 and 2.

The mechanism illustrated as an embodiment of my invention is adapted to receive a charge of molten glass from a furnace and to deliver the charge in globular or globe form to a moving mold which may form a part of a glass blowing, a glass pressing machine, or a glass blowing and pressing machine. As shown, the mechanism includes a collecting and conveying member 10 which is similar to a punty, except that it is adapted to receive a charge of molten glass from the flow orifice of a furnace. The mechanism is so arranged that this punty-like member moves from the charge receiving position to a charge delivering position with relation to the mold and then changes its motion so that it moves with the mold in such a way as to retain the charge carrying portion of the punty over the mold opening until the charge is delivered to the mold. The mechanism is also so arranged that the punty-like member is manipulated during the operation of transferring the charge from the receiving to the delivering position in such a way that the charge is retained in place thereon. The mechanism illustrated is also adapted to manipulate the punty during the operation of receiving the charge of molten glass from the flow orifice. This manipulation is for the purpose of accumulating the charge and retaining it in substantially spherical form on the end of the member. The mechanism is, however, so arranged that the manipulation of the member ceases as soon as or immediately prior to the time that the head 26 is over a mold, thereby permitting the charge to assume a drop-like or globular form. The charge is retained in position over the mold opening until it assumes the desired shape and size, after which it is severed from the carrying member and the member is moved back to a charge receiving position with relation to the flow orifice. During this travel of the punty, the glass, retained thereon after the severing operation, is stripped therefrom. As illustrated, the stripping operation is accomplished by subjecting the punty and the glass adhering thereto to sufficient heat to increase the fluidity of the glass and cause it to drop from the punty before the punty arrives at the charge receiving position.

Referring more particularly to the drawings: The furnace 11 is provided with a forehearth 12, adapted to receive molten glass and to deliver charges through an orifice 13 formed in the bottom thereof. The flow of glass through the orifice may be controlled by any suitable means, and in the drawings I have illustrated, by way of example, an ordinary plunger 14, which is adapted to move toward and away from the orifice 13 for the purpose of controlling the flow. I have also shown shears 15, which, with their operating mechanism, are mounted below the orifice and are adapted to sever the charges of glass delivered to the punty-like member 10.

It will, of course, be apparent that the form and location of the shears is a matter of discretion, except that the shears must be so located with relation to the orifice and so timed as to co-operate with the associated mechanism.

In the machine illustrated, two punty-like members 10 are employed and they are so located and arranged that one moves to the charge-receiving position as the other moves away from a mold to which a charge has been delivered. It will, of course, be apparent to those skilled in the art that any number of such members may be employed within the limits of practicability. As shown, each member 10 is provided with a punty-like head 16 and is mounted in a sleeve-like bearing 17, which is supported on a carriage 18. The carriage is mounted on a standard 19 in such a way that it is capable of moving the head 16 of the member 10 around the standard and also toward and away from the axis of the standard. This is accomplished in the illustrated embodiment of the invention by providing the standard 19 with a rotatable table 20, having a way 21 in which the carriage 18 is mounted and along which it is capable of moving. In the drawings, the table 20 is provided with two such ways 21, one for each carriage 18.

As illustrated, rotary motion is imparted to the table 20 by means of a cylinder 22, a co-operating piston (not shown) located within the cylinder, a rack 23 operatively coupled to the piston, a gear 24 meshing with the rack, a shaft 25 and an ordinary form of overrunning device or ratchet mechanism (not shown), preferably located between the gear 24 and the shaft 25. The shaft 25 is operatively coupled to the table 20 and the overrunning device is so arranged that the table is capable of being turned in one direction only by the rack 23 and is not reversed in rotation when the rack is moved back to the initial position by its cooperating piston after the rack has completed its forward or table-rotating stroke. It will be made apparent throughout the further description of the invention that any means may be employed for rotating the table 20.

In the drawings, each member 10 is provided with means for manipulating it during the operation of receiving a charge of glass from the orifice 13 and during the operation of conveying the charge from the charge-receiving position to a charge-delivering position over a mold. The manipulation may be accomplished by imparting any desired motion to the punty, which is capable of preventing a sagging of the charge carried by it. In the drawings, a small electric motor 26 is associated with each member 10 and is arranged to rotate the member while it is located in the charge-receiving position and while it is moving from that position to the charge-delivering position. Each motor 26 is mounted on the sleeve-like bearing 17, of the member 10 with which it is associated, and is adapted to rotate the member through the agency of a pinion 27 mounted on the motor shaft and a gear 28 mounted on the end of the member.

Current may be delivered to each motor through a contact strip 31 mounted on a cam 30 hereinafter described. The strip 31 is so located and arranged with relation to the swing of each member 10 that the motor receives current and consequently revolves the member 10, while that member is in position under the orifice and while it is moving to a discharging position with relation to the mold. Each motor is provided with a spring-pressed contact 31ᵃ or an equivalent device, adapted to move onto and off of the strip 31 as the member 10 swings about the standard. It will, of course, be understood that the speed of rotation of the member 10 may be adjusted by means of a rheostat or otherwise for the purpose of accomplishing the desired result. In order to cause the head 16 of each member to move with the mold after it has arrived at a discharging position with relation to one of the molds, I have provided a cam way 32 on the standard 19, which is adapted to receive a roller 33 carried by a bracket 34 mounted on the sleeve-like bearing 17. The longitudinal motion of the carriage 18, through the way 21, is controlled by the co-operation of the roller 33 with the cam way 32, the roller being so arranged that it enters the cam way shortly before the head 16 of its co-operating member is moved to position over a mold. The co-operation of the roller and the cam way then moves the member 10 longitudinally with relation to the way 21 for the purpose of causing the head 16 to follow the mold as the member 10 continues to turn about the standard 19. The carriage may be provided with any suitable means, such as a spring (not shown) for moving it to its initial position with relation to the way 21 after the roller 33 has moved out of the cam way 32, or the cam way may be so formed that it will return the carriage to the initial position before the roller 33 is released by it. In the apparatus illustrated, the cylinder 22 and the associated apparatus operate periodically in transmitting rotary motion to the table 20. Consequently, I have disclosed additional means for causing each member 10 to move with the mold after it has arrived at the charge delivering position with relation to the mold. As shown, the members 10 are adapted to deliver charges to molds 36, located on a rotating table 37, which may form a part of a glass blowing, a glass blowing and pressing, or a glass pressing machine. This table may be driven independently of the table 20, but with the arrangement illustrated, is preferably arranged so that it is capable of picking up each member 10 and carrying the member with it. This is rendered possible in the apparatus illustrated by the overrunning device or ratchet mechanism described as associated with the shaft 25. As shown, the table 37 is provided with a series of projecting arms 38, each of which is associated with one of the molds 36 and is adapted to engage a depending arm 39 secured to the carriage 18. The arrangement is such that the co-operation of the roller 33 and cam way 32 moves the depending arm 39 into the path of travel of one of the arms 38 and then continues to control the longitudinal motion of the member 10 after the arm carried by it has been picked up by one of the arms 38 of the mold carrying table. Any suitable means may be employed for compensating for the varying angular position of the member 10 with relation to the pivot points of the tables 20 and 37, so that the head 16 will be maintained in position over the mold 36. This is accomplished in the illustrated embodiment by providing each arm 38 with a cam-like face 40, so arranged that the head 16 is either advancing or receding with relation to the periphery of the table 37 as the cam way 32 moves the arm 39 toward the peripheral edge of the table.

With the mechanism illustrated, the head 16, with a charge of glass thereon, is maintained in position over the opening in a mold while the mold travels through an arc of appreciable length. Inasmuch as the manipulation of the member ceases at or immediately prior to the time that the head 16 reaches a discharge position with relation to the mold, the charge on the head sags to one side and finally elongates into a globular drop, which is suspended over the mold opening. This drop is severed from the head by means of shears 41. As shown in the drawings, each member 10 is equipped with and carries a set of shears 41. These shears may be of the ordinary form and are adapted to be actuated by a cam roller 42, which co-operates with the cam 30. The cam roller 42 is carried by the member 10, and consequently reciprocates with that member as it moves to retain the mold charge in place over the mold opening. For this reason, the cam 30 is not only formed to accomplish an operation of the shears, but is also so formed that the roller is maintained in its normal position, with relation to the member 10, until the point in the cycle is reached at which the shears are operated. This is accomplished by providing a lobe 43 on the cam, which causes the roller to move outwardly as the carriage 18 moves outwardly in response to the co-operation of the cam way 32 and the cam roller 33. The roller 42 is carried by a rod 44, which is movable longitudinally of the carriage and is operatively connected to the operating mechanism of the shears 41. A spring 45 is employed for the purpose of holding the roller 42 against the peripheral face of the cam. As the member 10 arrives at the charge severing position, the roller 42 simultaneously drops into a depression 46 formed in the cam face and the shears 41 are operated by the expansion of the spring 45. After the shears have been closed by this operation of the cam roller and the spring, the shears are immediately moved to an open position by the further movement of the member 10 around the standard 19. This is affected by the co-operation of the cam and roller, the cam being so proportioned that it will move the roller outwardly with relation to the member 10 as soon as the severing operation has been completed.

In Figure 5 I have shown a detail of the shears 41. As there indicated, each blade is carried by an arm 47 which terminates in a hub 48. The hubs of the two arms 47 are located concentrically and are pivoted on a pin 49. The rod 44 is adapted to actuate links 50, each of which is connected to one of the hub members 48 in such a way that the shears are moved to a closed position as the rod 44 moves away from the pivot point of the shears in response to the action of the spring 45.

In order to strip the punty or free it from the glass adhering to the head 16, after a mold charge has been severed by the action of the shears, I have provided an automatically actuated torch 52, which is adapted to be picked up by the member 10 as it moves from the mold charging position to a charge receiving position. As illustrated, the torch is provided with a gas burner so located and arranged that it is capable of subjecting the head 16 to intense heat as it moves through a portion of its travel in returning to the flow orifice 13. Any suitable means may be employed for actuating the torch and causing it to move with the member 10 after a charge has been delivered to a mold. In the drawings I have illustrated more or less diagrammatically one method of accomplishing the automatic operation of the torch. As shown, the torch consists of a pipe 53 which is equipped with a suitable burner and is adapted to receive gas or other fuel through a flexible connection, such as a hose 54 located within the standard 19. The inner end of the pipe is pivotally mounted on a bracket 55 carried by a rotatable plate 56, which is located within and concentrically of the standard 19. As shown, the plate 56 is located on an annular flange 57 formed integrally with or secured to the inner face of the standard 19 and it is held in place by means of an arc-shaped bracket 58, also secured to the inner face of the standard 19. The plate is provided with a centering boss 59, which co-operates with the inner edge of the flange 57, and the plate and boss are provided with a central opening through which the shaft 25 extends. As shown, the hose 54 is connected to a tip 60 located on the lower face of the boss 59 and communicating with a passage, which extends upwardly through the boss and the plate and communicates with an elbow 61 rigidly secured to the plate. The elbow is secured to one element of a union 62, which co-operates with other elements of the union rigidly secured to the pipe 53. By this arrangement, the pipe 53 is capable of pivoting about the union for the purpose of moving the burner carried by it, up or down as the pipe swings through the arc of a circle. The pivotal motion of the pipe 53 is controlled by a roller 63, carried by the pipe, and engaging a slot 64 formed in the standard 19 and through which the pipe projects. As shown in Figure 3, each member 10 carries a depending arm 65, which is adapted to engage the pipe 53 and cause it to move with the member 10 as the member moves from the charge-delivering position toward the orifice 13. The slot 64 may be so formed that it first causes the burner 32 to move upwardly toward the head 16 and then causes it to move gradually downward away from the head as the roller 63 moves along the slot. The arm 65 is of such length that it will engage the pipe 53 when the roller 63 is located in the forward end 66 of the slot, but the slot is so formed that the pipe will drop below the arm 65 as the roller 63 approaches the rear end 67 of the slot. With this arrangement, the pipe 53 will be picked up by each member 10 as the member moves around the standard 19 and will be released after the pipe and the member have moved through an arc of sufficient length to insure a complete stripping of the head 16.

Any suitable means may be employed for returning the torch to its initial position with the roller 63 at the forward end 66 of the slot. For example, a coil spring (not shown) may be located between the plate 56 and the standard 19 and may be so arranged that it will return the plate to its initial position after the pipe 53 has been released by the arm 65. It will also be apparent that the flow of gas through the pipe 53 may be automatically controlled by the vertical movement of the pipe in such a way as to conserve gas and at the same time deliver a requisite quantity while the burner 52 is moving with one of the members 10. For example, this may be accomplished by providing gas delivery ports in the relatively movable members of the union 62, so arranged that the relative motions of these members will vary the supply of gas passing through the pipe 53, and will deliver the maximum quantity when the torch is in its uppermost position.

The operation of the apparatus is as follows: As one of the members 10 moves to bring its head 16 under the flow orifice 13, the feed mechanism will operate to deliver a charge of glass from the forehearth to the head 16 of that member. In this position of the member, the motor 26 associated with it will preferably be receiving current through the contact strip 31 and will rotate the head 16. When the member is in this position, the piston associated with the cylinder 22 will preferably be retracted to its initial position ready to move the rack 23 outwardly with relation to the cylinder. As soon as the head 16 has received a charge of glass and the shears 15 have operated, the rack 23 will move in response to pressure delivered to the cylinder 22 and will swing the member 10 in the direction indicated by the arrow in Figure 2. During this movement of the member, the motor 26 will continue to rotate the head 16 for the purpose of maintaining the charge of glass in place thereon. As the member swings in the direction indicated, the roller 33 carried by it enters the cam way 32 and moves the member outwardly with relation to the standard 19 so that the arm 39 carried by it moves into the path of travel of one of the arms 38 carried by the rotating table 37 and the head 16 moves with one of the molds 36 on the table 37. The table 37 preferably rotates at such a speed that the peripheral travel of the lugs 38 is slightly greater than the peripheral travel of the arm 39 at the time the roller 33 enters the cam way. Consequently, the arm 39 will be picked up by one of the arms and it, together with the cam way 32 and the cam roller 33, will hold the head in position over the mold opening, and at the same time assume the function of turning the member 10 about the standard, since the overrunning device associated with the shaft 25 of the standard will permit the member 10 to run ahead of the rack 23. As the member 10 moves with the table 37, the charge of glass carried by it elongates, due to the fact that the motor 26 has ceased to manipulate the head 16 and the charge will assume a shape such as to facilitate the operation of severing and delivering it to the mold 36 over which it is suspended. After the severing operation, the member 10 continues its motion about the standard 19, thereby freeing the roller 33 from the cam way 32, and in addition, causing the shears 44 to open due to the co-operation of the roller 42 and the cam 30. This motion may be transmitted by the rack 23 or by any other suitable means and in the apparatus such as illustrated, where two members 10 are mounted on the same revolving table 20, one of the members moves to the charge receiving position under the orifice 13 as the other one moves away from the mold to which it has just delivered a charge of glass. The driving mechanism of the table 20 stationary while one member is receiving a charge and while the other member is being stripped of the glass retained on the head portion thereof. For this reason, the torch 52 is preferably so positioned that it will be engaged by the arm 65, of the member which has just delivered a charge to a mold, as the head portion of that member moves away from the mold. With the arrangement of apparatus illustrated in Figures 3 and 4, the short rotary movement of the member, between the time that it delivers a charge and the time that it comes to rest, will be sufficient to raise the torch to a point adjacent the head 16 because of the shape of the slot 64 (see Figure 4). Consequently, one head will be subjected to a stripping heat while the other head is receiving a charge. The rack 23 is also retracted during this charge receiving period and at the end of the period is in a position to again advance the table 20. As the rack advances the table, the member 10 carries the torch 52 with it and thereby continues the operation of heating the head 16. As the torch advances, it moves downwardly away from the head until it is free from the arm 65 at which time it returns in response to the pull of its retracting spring. The operating mechanism described then continues the rotation of the table 20 and repeats the cycle above described.

In order to release the arms 39 from engagement with the arms 38 carried by the table 37, each arm 38 is shown pivotally mounted on the table 37 and is so arranged that it will move to disengage the arm 39 after the shears 44 have operated. This may be accomplished by means of a cam associated with the table 37, or by any equivalent mechanism.

It will be apparent that the table 37 may be located in any convenient position with relation to the standard 19 and that its speed of rotation may be such that its arms 38 will pick up the arms 39 of the members 10 without the necessity of slowing down the speed of rotation of the table 20. It will also be apparent that the operation of the charge feeding mechanism may be controlled by the movement of the members 10 and that the speed of the table 37 may also be co-related with the drive mechanism of the table 20.

While I have described but one embodiment of my invention, it will be apparent that various changes, modifications, additions, omissions and substitutions may be made in the apparatus illustrated without departing from the spirit and scope of my invention as set forth by the appended claims.

What I claim is:

1. The method of delivering a charge of molten glass from a furnace to a continuously moving mold, which consists in delivering a stream of glass from the furnace, accumulating the glass so delivered into a ball-like mass, moving the mass to a charge-delivery position over a mold, and continuing the motion of the mass so as to maintain the mass over a moving mold while the mass of glass forms into a depending globule, and in severing the globule from the mass as it moves with the mold.

2. The method of delivering a charge of molten glass from a furnace to a moving mold, which consists in delivering a stream of glass from the furnace, accumulating the glass so delivered into a ball-like mass, moving the mass to a charge-delivery position over a moving mold, while manipulating to maintain the mass in ball-like formation, moving the mass with the mold to maintain it in a charge-delivery position while permitting accumulated glass to depend therefrom in the form of a drop, and in severing the drop as it moves with the mold.

3. The method of delivering a charge of molten glass from a furnace to a moving mold, which consists in delivering a charge of glass from the furnace, accumulating the glass so delivered into a ball-like mass, moving the mass to position over a moving mold, and turning said mass at least during a portion of said movement to maintain the ball-like formation thereof, continuing the motion of the mass to maintain it in a charge-delivery position over the moving mold, while permitting glass of the mass to assume a drop-like formation over the mold, and severing the depending drop while the mass of molten glass is moving with the mold.

4. The method of delivering a charge of molten glass from a furnace to a moving mold, which consists in delivering a charge of glass from the furnace, accumulating and manipulating the accumulated charge so delivered so as to retain it in a more or less compact form, moving the mass to a charge-delivering position over a moving mold, stopping the manipulation of the mass to cause a globule of glass to depend therefrom, while continuing the movement of said mass with the mold to maintain the globule in position over the opening of the mold, severing the globule from the mass while it is moving with the mold, and then subjecting the mass to a stripping heat.

5. The method of delivering a charge of molten glass from a furnace to a moving mold, which consists in delivering a charge of glass from the furnace, accumulating the glass so delivered into a rounded mass, and continuing the accumulating movement of the mass to maintain the form of the mass, moving the mass to a charge-delivering position over a moving mold, and continuing the movement so as to maintain the mass in a charge-delivering position over the moving mold, stopping the manipulation of the mass during the movement thereof to cause a globule of molten glass to depend therefrom and delivering the globule to the mold while the mass is moving with the mold.

6. The method of delivering a charge of molten glass from a furnace to a moving mold, which consists in delivering a charge of glass from the furnace, accumulating the glass so delivered into a rounded mass, and continuing the accumulating movement of the mass to maintain the form of the mass, moving the mass to a charge-delivering position over a moving mold, and continuing the movement so as to maintain the mass in a charge-delivering position over the moving mold, stopping the manipulation of the mass during the movement thereof to cause a globule of molten glass to depend therefrom and delivering the globule to the mold while the mass is moving with the mold, then subjecting the mass to a stripping operation.

7. In combination with a continuously moving mold conveyor, a mold mounted thereon, a member movable in an orbital path from a feeding device to a position above said mold, to collect a charge from said device and deliver it to said mold, means for moving said member and means whereby said member is impelled by said conveyor throughout the portion of its travel above said mold.

8. In combination with a continuously moving mold conveyor, a mold mounted thereon, a member movable in an orbital path overlapping the path of said mold, means for delivering a charge for said mold to said member, means for moving said member, means including an over-running device whereby said member is impelled throughout a portion of its movement by said conveyor and means for disengaging the charge from said member while said member is impelled by said conveyor.

9. In combination with a continuously moving mold conveyor, a mold mounted thereon, a member movable from a feeding device to a position above said mold and back to said feeding device, a feeding device for delivering mold charges to said member, means for impelling said member and means including an over-running device whereby said member is impelled throughout a portion of its travel by said conveyor and means for disengaging a charge from said member while it is being impelled by said conveyor.

10. In combination with a moving mold and a glass feeding apparatus, a member for receiving a charge of molten glass from said apparatus, means for moving said member from the apparatus to a charge delivering position over said mold, and for maintaining the charge over the mold opening of the moving mold, means for manipulating said member to maintain the charge in place thereon during the movement from said apparatus to the mold and means for delivering the charge to the mold while the member and the mold are in motion.

11. In combination with a moving mold and a glass feeding device, a movable punty-like member for receiving a charge of molten glass from said device and for delivering the charge to said mold, means for moving said member from a charge receiving to a charge delivering position with relation to the mold, and for moving the member with the mold to maintain the charge in a delivering position with relation to the mold, and shears, the operation of which is controlled by the movement of said member for severing the charge from said member while the member is moving with the mold.

12. In combination with a moving mold and a glass feeding device, a movable punty-like member for receiving a charge of molten glass from said device and for delivering the charge to said mold, means for moving said member from a charge receiving to a charge delivering position with relation to the mold, and for moving the member with the mold to maintain the charge in a delivering position with relation to the mold, and shears moving with said member for severing the charge from said member.

13. In a glass making machine, a feed device for feeding charges of molten glass, a moving conveyer, a mold mounted on said conveyer, in combination with a punty-like member for receiving charges of molten glass from said device, means for moving said member from a charge receiving to a charge delivering position with relation to the mold and for moving the member with the mold to maintain the charge in a delivering position with relation to the mold, means for manipulating said member while moving from the charge receiving to the charge delivering position, and shears moving with the member for severing a charge therefrom.

14. In combination in a glass-making apparatus, a mold, a feed device having a flow orifice, means for delivering charges of molten glass through said orifice, a movable punty-like member, means for moving said member to position below said flow orifice, to receive a charge of molten glass from the orifice and to position above the mold to deliver a charge of glass to the mold, and means for manipulating said member while receiving the charge from the device and while transferring the charge to the mold to accumulate and maintain the charge in masslike form.

15. In combination in a glass-making apparatus, a moving mold, a feed device having a flow orifice, means controlling the delivery of charges of molten glass to said orifice, a punty-like member, means for moving said member to a charge-receiving position below the orifice and to a charge-delivering position above the mold, and means for manipulating said member while in the charge receiving position and while moving therefrom to the charge-delivering position to accumulate and maintain the charge in mass-like form, and means for severing a charge of glass from the member while the member is moving with the mold.

16. In a glass making machine, a feed device, a mold, a movable punty-like member, means for moving said member to a charge receiving position, below a flow orifice of said device, to a charge delivering position with relation to said mold and back to the charge receiving position, means for severing a mold charge from said member, and means for stripping the remaining glass from said member.

17. In a glass making machine, a feed device, a mold, a movable punty-like member, means for moving said member to a charge receiving position with relation to said device, to a charge delivering position with relation to the mold, and back to the charge receiving position, means for manipulating said member while a charge is delivered thereto, and means for subjecting said member to heat after a charge has been delivered by said member.

18. In a glass making machine, a feed device, a mold, a movable punty-like member, means for moving said member to a charge receiving position with relation to said device and to a charge delivering position with relation to said mold, and means for heating said member after a charge has been delivered and before the next charge is received.

19. In a glass making machine, a feed device, a mold, a movable punty-like member, means for moving said member to a charge receiving position with relation to the device, and to a discharge position with relation to the mold, means for manipulating said member during the charge receiving operation to accumulate a charge thereon, and means for heating said member after a charge has been delivered thereby and before a subsequent charge is delivered thereto.

20. In a glass making machine, a feed device, a mold, a movable punty-like member, means for moving said member to a position below a flow orifice of said device, and for moving the member to a charge delivering position with relation to the mold, and means movable with said member for heating the punty-like head thereof after a charge has been delivered and before a subsequent charge has been received.

21. In combination in a glass-making apparatus, a feed device having a flow orifice formed therein, means for controlling the flow of molten glass therethrough, a moving mold, a punty-like member, means for moving said member, means for moving said member to a charge-receiving position below the orifice, to a charge-delivering position above the mold and with the mold to maintain the charge in position over the moving mold, means for manipulating said member to accumulate and maintain thereon a charge delivered from said orifice, and means for severing a molded charge from said member while said member is moving with said mold.

22. In combination in a glass making machine, a feed device having a flow orifice formed therein, means for controlling the flow of molten glass through said orifice, a punty-like member movable to a position in the line of flow from said orifice to receive a charge of glass therefrom, a moving mold, means for moving the member from the charge receiving position to a charge delivering position relatively to said mold, and separate means for moving the member with the mold to maintain the charge in a delivering position with relation to the mold.

23. In combination in glass-making apparatus, a movable mold, a punty-like member for collecting a charge of molten glass and delivering it to the mold, and means for severing the charge of glass from the member while the member is moving with the mold.

24. In combination in glass-making apparatus, a furnace, a punty-like member for collecting a mold charge from the furnace, a moving mold, means for moving said member to maintain the mold charge over the mold while the same is moving, and means for delivering the mold charge to the mold while the member is moving with mold.

25. The method of delivering charges of molten glass from a furnace to a moving mold which consists in delivering a charge of glass from the furnace, accumulating the charge into a rounded mass, moving the mass to position over a moving mold while manipulating to maintain the mass-like formation, stopping the manipulation to cause a globule of glass to depend from the mass, continuing the movement of the mass with the mold as the globule forms and delivering the globule to the mold while the mass is moving with the mold.

26. The method of obtaining gathers of molten glass, which consists in moving a gathering implement in an orbital path which intersects a stream of molten glass, arresting the orbital movement of the implement at the point of intersection of its orbital path with the stream and rotating the implement at said point.

27. The method of obtaining gathers of molten glass, which consists in moving a plurality of rotating gathering implements in an orbital path which intersects a supply of molten glass, and successively arresting the orbital movement of each implement at the point of intersection of its orbital path with the supply.

28. The method of obtaining gathers of molten glass, which consists in moving a plurality of rotating gathering implements in an orbital path which intersects a stream of molten glass, and successively arresting the orbital movement of each implement at the point of intersection of its orbital path with the stream.

29. In apparatus for feeding molten glass, the combination with a plurality of rotating gathering implements, of means for moving said implements in an orbital path which intersects a stream of molten glass, and means for successively arresting the orbital movement of each implement at the point of intersection of its orbital path with the stream.

30. In apparatus for feeding molten glass, the combination with a plurality of gathering implements, of means for moving said implements in an orbital path which intersects a stream of molten glass, means for successively arresting the orbital movement of each implement at the point of intersection of its orbital path with the stream, and means for rotating the gathering implements while in contact with the stream to wind the glass on the implements.

31. The method of forming gathers of molten glass from a flowing stream which consists in flowing the glass upon a succession of gathering implements and winding the stream thereon to form a series of gathers from successive portions of the stream.

32. The method of forming gathers of molten glass from an unsupported flowing stream which consists in winding the stream successively on a series of gathering implements to form gathers thereon.

33. The method of feeding molten glass which consists in carrying a succession of gathering implements beneath a supply of molten glass and successively winding the glass on each of the gathering implements to form gathers thereon.

34. The method of feeding molten glass which consists in carrying a plurality of gathering implements into proximity with a freely flowing stream of molten glass, and successively rotating each of the gathering implements in contact with the stream to collect gathers of molten glass thereon.

35. The method of feeding molten glass which consists in rotating a series of punties, carrying the rotating punties successively into contact with a freely flowing stream of molten glass to obtain gathers therefrom, stopping the translatory motion of each punty while it is collecting its gather, and moving the gathers away from the stream.

36. The method of forming mold charges of molten glass from a freely falling stream, which consists in winding the stream upon itself to form a gather, separating it from the stream, and then discharging a mold charge from the gather.

37. The method of obtaining mold charges of molten glass from a flowing stream, which consists in flowing the stream upon a succession of revolving punties, winding the stream upon each punty in succession, stopping the winding action to suspend the successive gathers, and severing a mold charge from each suspended gather.

38. The method of obtaining mold charges of molten glass from a flowing stream, which consists in flowing the glass upon a succession of revolving punties, continuing the winding action until gathers are accumulated and separated from the stream and from each other, stopping the revolving and winding action to suspend the gathers, and severing a mold charge from each suspended gather.

39. The method of forming mold charges of molten glass from a flowing stream, which consists in winding the end of the stream upon itself to form a gather, pulling the gather away and separating it from the stream, and then discharging a mold charge from the gather, and meanwhile forming a succeeding gather by a similar series of operations while a mold charge is being discharged from the first gather.

40. In apparatus for feeding molten glass, the combination of a plurality of gathering implements, means for moving the implements successively into contact with a supply of glass, and means for rotating the successive implements while in contact with the supply.

41. In apparatus for feeding molten glass, the combination with a supply of molten glass, of a plurality of gathering implements, and means for rotating one gathering implement in contact with the supply to obtain a charge of glass therefrom while another gathering implement is being discharged.

42. In apparatus for feeding molten glass, the combination of a container for the molten glass, a series of punties for collecting and discharging the glass, and means for causing one of said punties to gather glass by adhesive contact while another of said punties is discharging a gather accumulated on it.

43. In apparatus for feeding molten glass, the combination of means for delivering glass as a flowing stream, a series of punties, and means for revolving the punties into the line of flow to accumulate gathers of molten glass thereon by adhesive contact, and out of the line of flow to discharge the gathers.

44. In apparatus for feeding molten glass, the combination of a plurality of gathering implements, means for successively positioning and rotating them in contact with a supply of molten glass to accumulate gathers thereon by adhesive contact, and means for moving one gathering implement away from its gathering position while moving another gathering implement into its gathering position.

45. In apparatus for feeding molten glass, the combination of a plurality of gathering implements, means for successively positioning and rotating them in contact with a source of supply of molten glass to accumulate gathers thereon by adhesive contact, and means for successively positioning the gathering implements at a common discharging position to deliver mold charges from their respective gathers.

46. In apparatus for feeding molten glass, the combination of a supply of molten glass, a plurality of gathering implements, means for revolving said implements successively into and out of contact with the supply of molten glass, means for rotating each gathering implement while in contact with the supply to obtain a gather of glass therefrom, and means for stopping the rotation of each gathering implement while it is out of contact with the supply to discharge a mold charge from the gather previously accumulated on it.

47. In apparatus for feeding molten glass, the combination of a gathering implement, means for revolving same in a closed path into and out of contact with a source of glass supply to accumulate a gather of molten glass thereon by adhesive contact, and means for rotating the implement when in contact with the supply.

48. In apparatus for feeding molten glass, the combination of a plurality of gathering implements, means for revolving the gathering implements into contact with a supply of molten glass and rotating them when in contact therewith to accumulate gathers therefrom, means for revolving the gathering implements out of contact with the supply to deliver mold charges from their gathers, and means for returning the gathering implements to the supply of glass by a different path to obtain further gathers of glass.

49. In apparatus for feeding molten glass, the combination of a plurality of rotating gathering implements, means for revolving same in a closed path into and out of contact with a source of glass supply to accumulate gathers of molten glass thereon, and means for causing each successive gathering implement to accumulate its gather while a preceding gathering implement is discharging its gather.

50. In apparatus for feeding molten glass, the combination of a plurality of punties, means for successively accumulating gathers of molten glass thereon from a flowing stream of molten glass, means for separating the successive gathers from the flowing stream by a movement away from the stream, and means for discharging mold charges from the gathers.

Signed this twenty-sixth day of August, nineteen hundred and twenty.

CARL HENRY RANKIN.